United States Patent
Eshima et al.

(10) Patent No.: US 8,541,681 B2
(45) Date of Patent: Sep. 24, 2013

(54) CABLE FIXING MEMBER

(75) Inventors: Hirotaka Eshima, Hitachi (JP); Yoji Kobayashi, Hitachi (JP); Satoshi Murata, Miyoshi (JP); Kei Takakuwa, Chiryu (JP)

(73) Assignees: Hitachi Cable, Ltd., Tokyo (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 95 days.

(21) Appl. No.: 13/067,583

(22) Filed: Jun. 10, 2011

(65) Prior Publication Data
US 2012/0085577 A1    Apr. 12, 2012

(30) Foreign Application Priority Data
Oct. 6, 2010    (JP) .................................. 2010-226769

(51) Int. Cl.
*H02G 3/00* (2006.01)
(52) U.S. Cl.
USPC ........................ 174/70 R; 248/68.1; 248/74.1
(58) Field of Classification Search
USPC ............ 174/70 R; 248/68.1, 74.1, 74.2–74.5
See application file for complete search history.

(56) References Cited

U.S. PATENT DOCUMENTS

| | | | | |
|---|---|---|---|---|
| 2,735,636 A | * | 2/1956 | Snyder et al. ................. | 248/27.1 |
| 4,179,774 A | * | 12/1979 | Bradbury .................... | 24/132 R |
| 5,004,194 A | * | 4/1991 | Watanabe .................... | 248/74.5 |
| 6,354,545 B1 | * | 3/2002 | Liao .............................. | 248/214 |
| 2007/0272806 A1 | * | 11/2007 | Kim ................................ | 248/62 |
| 2009/0072099 A1 | * | 3/2009 | Trotter et al. ................ | 248/74.1 |

FOREIGN PATENT DOCUMENTS

| | | |
|---|---|---|
| JP | 2001-208244 A | 8/2001 |
| JP | 2007-292167 A | 11/2007 |
| JP | 2010-142167 | 6/2010 |
| WO | WO 2008090236 A1 * | 7/2008 |

OTHER PUBLICATIONS

Notification of Reason(s) for Refusal dated Sep. 25, 2012, with English translation.
U.S. Appl.No. 13/113,134 with specification, claims, abstract and drawings.

* cited by examiner

*Primary Examiner* — Hoa C Nguyen
*Assistant Examiner* — Paresh Paghadal
(74) *Attorney, Agent, or Firm* — McGinn Intellectual Property Law Group, PLLC

(57) ABSTRACT

A cable fixing member formed of one belt-like metal plate bent to fix three cables to a structure includes two flanges formed at both ends of the metal plate, two C-shaped holding portions formed to be bent into C-shapes in cross section on both sides respectively of a reference portion of the metal plate to hold two of the three cables in the C-shaped holding portions respectively, and two semicircular arc portions formed to be bent into semicircular arc shapes in cross section between the C-shaped holding portions and the flanges on both the sides respectively of the reference portion of the metal plate so that the two semicircular arc portions face each other to hold one of the three cables therebetween. The three cables are held so that the three cables are arranged to form a triangular shape in transverse cross sectional view.

20 Claims, 5 Drawing Sheets

| 1 CABLE FIXING MEMBER |
| 2 METAL PLATE |
| 3 FLANGES |
| 4 C-SHAPED HOLDING PORTIONS |
| 5 SEMICIRCULAR ARC PORTIONS |

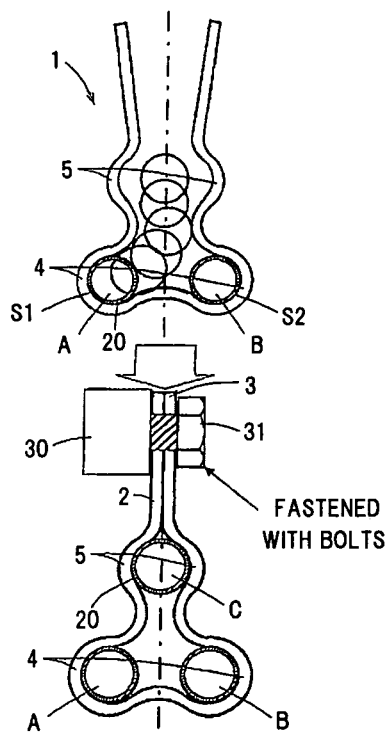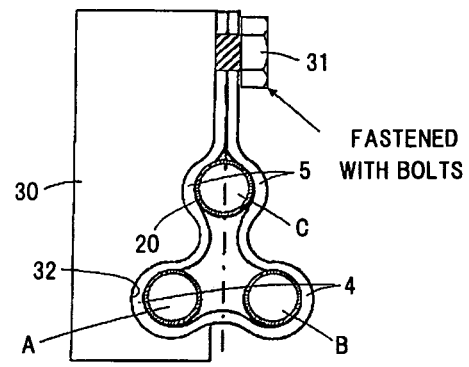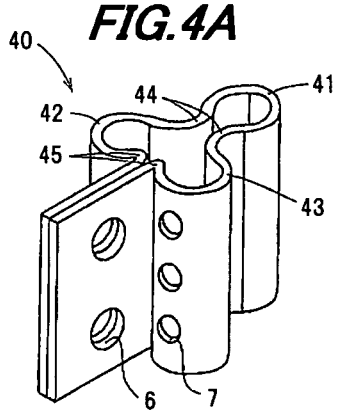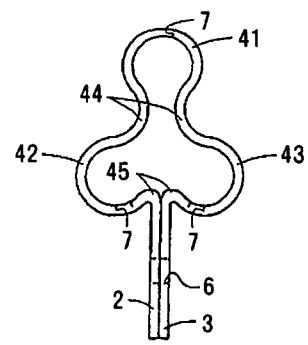

CABLE FIXING MEMBER

The present application is based on Japanese patent application No. 2010-226769 filed on Oct. 6, 2010, the entire contents of which are incorporated herein by reference.

BACKGROUND OF THE INVENTION

1. Field of the Invention

The present invention relates to a cable fixing member for fixing, for example, three cables routed through a narrow space around a vehicle suspension and the like, to a structure.

2. Description of the Related Art

Three cables, for example, routed through a narrow space around a vehicle suspension and the like, are fixed to a structure, such as a vehicle body, with a cable fixing member, to hold the routing layout of the cables, and thereby prevent the cables from contacting (and breaking) parts arranged adjacent to the cables.

The cable fixing member for fixing the cables to the structure is a cable fixing member 60 as shown in FIGS. 6A and 6B, for example. This cable fixing member 60 comprises two halved members 62a and 62b each formed with semicircular arc grooves 61 for holding the cables, so that these halved members 62a and 62b are clamped together and fastened to the structure at an end thereof with bolts or the like, to align and hold the cables parallel to each other and fix them to the structure.

Also, JP-A-2001-208244 discloses a pipe fixing structure constructed of two belt-like plate members, and easy to fasten.

Refer to JP-A-2001-208244, for example.

SUMMARY OF THE INVENTION

However, because in the above-described cable fixing member 60 the three cables to be fixed are aligned parallel to each other, the resultant area occupied by the cable fixing member 60 tends to be large. For this, there is the problem that the degree of freedom of cable routing through the narrow space is limited. Further, because the cable fixing member 60 comprises the two halved members 62a and 62b, i.e. the number of parts of the cable fixing member 60 itself is plural, the cost of the parts tends to be high.

Also, the pipe fixing structure of JP-A-2001-208244 is constructed of the belt-like plate members, and therefore is itself small size to allow compactness of the cable routing space, but is costly due to comprising the two belt-like plate members, i.e. the plurality of the parts, as described above.

In view of such circumstances, the provision of a cable fixing member, which is small sizeable and low cost, is desired.

Accordingly, it is an object of the present invention to provide a cable fixing member, which is small sizeable and low cost.

(1) According to one embodiment of the invention, a cable fixing member comprises:

two flanges formed at both ends of the metal plate;

two C-shaped holding portions formed to be bent into C-shapes in cross section on both sides respectively of a reference portion of the metal plate to hold two of the three cables in the C-shaped holding portions respectively; and two semicircular arc portions formed to be bent into semicircular arc shapes in cross section between the C-shaped holding portions and the flanges on both the sides respectively of the reference portion of the metal plate so that the two semicircular arc portions face each other to hold one of the three cables therebetween, wherein the three cables are held so that the three cables are arranged to form a triangular shape in transverse cross sectional view.

In the above embodiment (1) of the invention, the following modifications and changes can be made.

(i) The metal plate is bent at the two C-shaped holding portions serving as fulcrums respectively in such a manner that the two flanges face and contact each other, and two of the three cables are held in the two C-shaped holding portions respectively, and one of the three cables is held between the two facing semicircular arc portions.

(2) According to another embodiment of the invention, a cable fixing member comprises:

two flanges formed at both ends of the metal plate; and three C-shaped holding portions, one formed to be bent into a C-shape in cross section at a reference portion of the metal plate, and two formed to be bent into C-shapes in cross section on both sides respectively of the reference portion, to hold the cables in the three C-shaped holding portions respectively, wherein the three cables are held so that the three cables are arranged to form a triangular shape in transverse cross sectional view.

In the above embodiment (2) of the invention, the following modifications and changes can be made.

(ii) The metal plate is bent at the reference portion thereof serving as a fulcrum in such a manner that the two flanges face and contact each other, and one of the three cables is held in the C-shaped holding portion at the reference portion, and two of the three cables are held in the C-shaped holding portions on both the sides respectively of the reference portion.

In the above embodiment (1) or (2) of the invention, the following modifications and changes can be made.

(iii) The C-shaped holding portions are each formed with a bend hole or a cut along a line along which the metal plate is deliberately bent, so that when the metal plate is bent to cause the two flanges to face and contact each other, the C-shaped holding portions are pliable.

(iv) The cable fixing member further comprises metallic cylinders in which the cables respectively are held, and which each include a protruding portion for being engaged into the bend hole to prevent rotation of the cables.

(v) Both ends of the metallic cylinders are formed with a flanged portion for restricting longitudinal movement of the cables.

Points of the Invention

According to one embodiment of the invention, a cable fixing member includes two flanges formed at both ends of a metal plate, two C-shaped holding portions formed to be bent into C-shapes in cross section on both sides respectively of a reference portion of the metal plate to hold two of three cables in the two C-shaped holding portions respectively, and two semicircular arc portions formed to be bent into semicircular arc shapes in cross section between the C-shaped holding portions and the flanges on both the sides respectively of the reference portion of the metal plate to face each other to hold one of the three cables between the two semicircular arc portions. Therefore, it is possible to reduce the size of the cable fixing member, and hold the three cables in a triangular shape, thereby allowing compactness of the routing space therefor.

BRIEF DESCRIPTION OF THE DRAWINGS

The preferred embodiments according to the invention will be explained below referring to the drawings, wherein:

FIGS. 3A and 3B are diagrams showing operation of the cable fixing member shown in FIGS. 1A to 1D;

FIGS. 4A and 4B are a perspective view and a top view, respectively, showing a cable fixing member in another embodiment according to the invention;

DETAILED DESCRIPTION OF THE PREFERRED EMBODIMENTS

Below are described preferred embodiments according to the invention, referring to the accompanying drawings.

First Embodiment

FIGS. 1A, 1B, 1C and 1D are a perspective view, a top view, a front view, and a side view, respectively, showing a cable fixing member in one embodiment according to the invention.

Cable Fixing Member 1 Construction

As shown in FIGS. 1A to 1D, a cable fixing member 1 in this embodiment is formed of one belt-like metal plate 2 bent to fix three cables routed through a narrow space around a vehicle suspension and the like, to a structure, i.e. vehicle body.

Figure 1A:
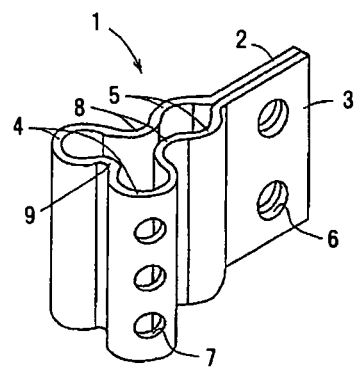
FIGS. 1A, 1B, 1C and 1D are a perspective view, a top view, a front view, and a side view, respectively, showing a cable fixing member in one embodiment according to the invention.
Figure 1B:
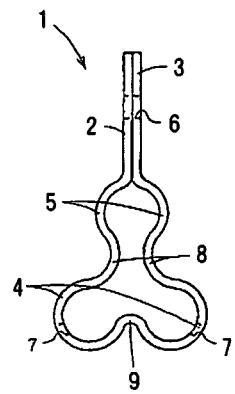

The cable fixing member 1 specifically includes two clamped flanges 3 formed at both longitudinal ends of the metal plate 2 to serve as a fixing portion when fixed to the structure, two C-shaped holding portions 4 formed to be bent into C-shapes in cross section on both sides respectively of a longitudinal middle portion (reference portion, i.e., a portion in the proximity of a part shown by numeral 9 in FIG. 1A) of the metal plate 2 to hold two of the three cables in the two C-shaped holding portions 4 respectively, and two semicircular arc portions 5 formed to be bent into semicircular arc shapes in cross section between the C-shaped holding portions 4 and the clamped flanges 3 on both the sides respectively of the longitudinal middle portion of the metal plate 2 to face each other to hold one of the three cables between the two semicircular arc portions 5. The three cables are held in the cable fixing member 1 so that the three cables are arranged to form a triangular shape in transverse cross sectional view, more specifically, the shape formed by joining the centers of the three cables is a triangle (an isosceles triangle, or an equilateral triangle).

Metal Plate 2 Bending Method

The metal plate 2 may use an excellent corrosion resistant and durable metal. The bending of the metal plate 2 may be made with any method such as a press. Because of being thus bent, the metal for the metal plate 2 needs having excellent workability. When bent, the metal plate 2 may be formed with cuts in its portions respectively to be bent so that it is pliable therein.

Flanges 3

The clamped flanges 3 at both the ends of the metal plate 2 are formed with bolt holes 6 in corresponding portions thereof for bolting. The clamped flanges 3 are bolted to the structure, thereby allowing the cables to be held in the cable fixing member 1, and the cable fixing member 1 to be fixed to the structure.

C-Shaped Holding Portions 4

The C-shaped holding portions 4 are formed in such shapes as to surround substantial (at least 180 degree) portions of the perimeters of the two cables, respectively, to be able to hold the two cables independently. Also, the C-shaped holding portions 4 are each formed with a plurality of (in FIGS. 1A, 1C and 1D, three) bend holes 7 at a bottom thereof. These bend holes 7 are for, when the metal plate 2 is bent to cause the clamped flanges 3 to face and contact each other, deliberately bending the bottoms of the C-shaped holding portions 4 in such a manner that the C-shaped holding portions 4 are bent to fold to the inner surface side thereof to hold the two cables in the C-shaped holding portions 4 respectively. That is, by being formed with the bend holes 7, the C-shaped holding portions 4 are lower in rigidity and therefore more pliable around the bend holes 7 than in the rest of the C-shaped holding portions 4. Also, the bend holes 7 serve as visual inspection holes for confirming positions of the two cables to align the two cables.

Figure 1C:
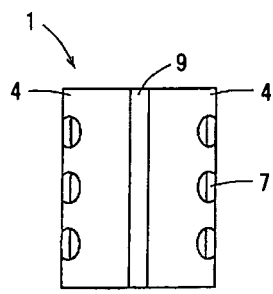
Figure 1D:
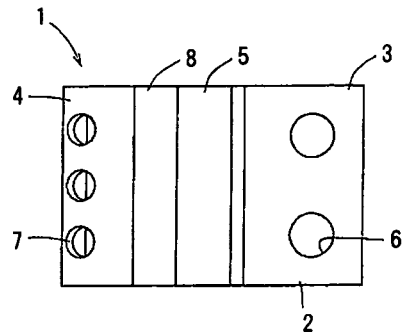

Although in this embodiment the bottoms of the C-shaped holding portions 4 have deliberately been bent by forming the bend holes 7, the same effect is also achieved by replacing the bend holes 7 with cuts, each formed along a line along which the C-shaped holding portions 4 are deliberately bent, and from one end or both ends of an outer edge of the metal plate 2. Also, cuts may, without replacing the bend holes 7, be each formed along a line along which the C-shaped holding portions 4 are deliberately bent, and from an outer edge of the metal plate 2 to the bend holes 7 positioned at both ends of that outer edge. This makes the C-shaped holding portions 4 more pliable, in comparison to when only the three bend holes 7 are formed therein for one line along which the C-shaped holding portions 4 are deliberately bent, as shown in FIGS. 1A, 1C and 1D.

Semicircular Arc Portions 5

The semicircular arc portions 5 are formed to be positioned symmetrically with respect to the longitudinal middle portion of the metal plate 2 as a symmetric axis, so that when the metal plate 2 is bent to cause the clamped flanges 3 to face and contact each other, the semicircular arc portions 5 face each other to hold one cable therebetween. That is, whereas the C-shaped holding portions 4 can hold the two cables respectively singly and independently, the semicircular arc portions 5 can hold one cable therebetween with a desired holding force by facing each other.

These C-shaped holding portions 4 are smoothly joined by a joining portion 9 having a circular arc cross section, while the C-shaped holding portions 4 and the semicircular arc portions 5 are smoothly joined by joining portions 8 respectively having a circular arc cross section.

Metallic Cylinder 20

Figure 2A:
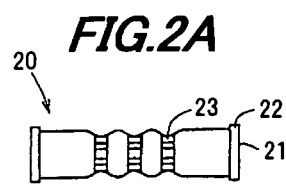
FIGS. 2A and 2B are a side view and a cross-sectional view, respectively, showing a metallic cylinder.
Figure 2B:
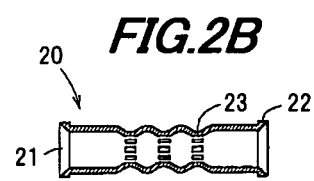

The three cables are held in the cable fixing member 1 via a metallic cylinder 20, as shown in FIGS. 2A and 2B.

The metallic cylinder 20 comprises a hollow circular cylinder having openings 21 at both its ends respectively. The respective inner surfaces of the openings 21 are increased in diameter to facilitate the insertion of the cables, while the outer surfaces of the openings 21 are formed with flanged portions 22 respectively to restrict the longitudinal movement of the cables fixed to the cable fixing member 1, to prevent slipping of the cables. That is, the length between both the flanged portions 22 is substantially the same as the width of the metal plate 2.

Figure 2C:
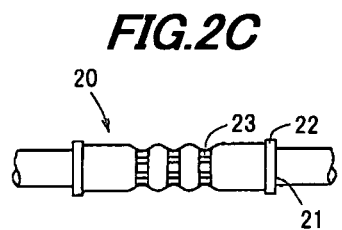
FIG. 2C is a side view showing the metallic cylinder with a cable held therein.

When the cables are fixed to the cable fixing member 1, as shown in FIG. 2C, following the insertion of the cables into the metallic cylinder 20, the perimeter of the metallic cylinder 20 is calked longitudinally to form a calking portion 23, and the metallic cylinder 20 is fixed to specified positions on the cables. In this embodiment, eight points on the perimeter of the metallic cylinder 20 are calked.

Figure 2D:
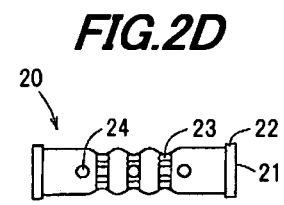
FIG. 2D is a side view showing a modified example of the metallic cylinder.

The shape of the calking portion 23 of the metallic cylinder 20 is not limited to the shape as shown in FIGS. 2A to 2C, but as shown in FIG. 2D, protruding portions 24 for example may be formed thereon to be engaged into the bend holes 7 respectively to prevent rotation of the cables.

Operation of the Cable Fixing Member 1

Cable fixation using the cable fixing member 1 is described next, referring to FIGS. 3A and 3B.

Referring to FIG. 3A, cables A and B are first disposed in the two C-shaped holding portions 4, respectively. Thereafter, the metal plate 2 is bent at bottoms each formed with the bend holes 7 therein, of the two C-shaped holding portions 4 serving as fulcrums S1 and S2, respectively, to cause the clamped flanges 3 to face and contact each other.

Each of the two C-shaped holding portions 4 is then bent to fold to the inner surface side thereof, to hold the cables A and B in the two C-shaped holding portions 4 respectively.

After the cables A and B are held therein, a cable C is disposed in either of the two semicircular arc portions 5. Following that, the metal plate 2 is bent further, to cause the two semicircular arc portions 5 to face and hold the cable C therebetween.

Thereafter, the clamped flanges 3 are fixed to a structure 30 with bolts 31 or the like, whereby the cables A, B, and C are fixed in a triangular shape in transverse cross sectional view, and the routing thereof is completed. At this point, the cables A, B, and C are held in the shape of a substantially equilateral triangle in transverse cross sectional view, so that each cable A, B, and C is fixed compactly and by an equal force. For that, the C-shaped holding portions 4 and the semicircular arc portions 5 may be configured to hold the cables A, B, and C as in the shape of an equilateral triangle as possible.

In this manner, the three cables A, B, and C are held in the cable fixing member 1, and the cable fixing member 1 is fixed to the structure 30. Although in this embodiment the cables A, B, and C have been held and thereafter the clamped flanges 3 have been fixed to the structure 30, these steps may simultaneously be performed. This allows a shorter time fixing of the cables A, B, and C.

In this manner, with the cable fixing member 1 in this embodiment, the cables A and B are first held therein, and the cable C is then held therein. In other words, the cables A, B, and C are fixed in the two steps. This allows each cable A, B, and C to be not only more easily positioned, but also disposed in accordance with design than when the three cables A, B, and C are fixed at a time.

Referring to FIG. 3B, a surface of the structure 30 is formed with a receiving groove 32 matched to a surface shape of the cable fixing member 1, whereby when the cable fixing member 1 is fixed to the structure 30, the cable fixing member 1 and the structure 30 are allowed to be easily positioned, and fixed together in a short time in comparison to the prior art, and also, after being fixed together, prevented from being wobbly due to vibration, etc.

Advantages of the First Embodiment

In summary, since the cable fixing member 1 in this embodiment includes the two clamped flanges 3 formed at both ends of the metal plate 2, the two C-shaped holding portions 4 formed to be bent into C-shapes in cross section on both sides respectively of the longitudinal middle portion of the metal plate 2 to hold the cables A and B in the two C-shaped holding portions 4 respectively, and the two semicircular arc portions 5 formed to be bent into semicircular arc shapes in cross section between the C-shaped holding portions 4 and the clamped flanges 3 on both the sides respectively of the longitudinal middle portion of the metal plate 2 to face each other to hold the cable C between the two semicircular arc portions 5, it is possible to reduce the size of the cable fixing member 1, and hold the three cables A, B, and C in a triangular shape, thereby allowing compactness of the routing space therefor, in comparison to the prior art aligning and fixing the three cables A, B, and C parallel to each other.

Also, since the cable fixing member 1 is formed by bending one metal plate 2, i.e. the number of parts is one, it is possible to ensure that the cable fixing member 1 is low cost, in comparison to the prior art cable fixing member.

Further, since the fixing of the cables A, B, and C can be phased, it is easy to position each cable A, B, and C, and it is possible to enhance the routing thereof.

Second Embodiment

A cable fixing member in another embodiment according to the invention is described next.

Cable Fixing Member 40 Construction

Figure 5A:
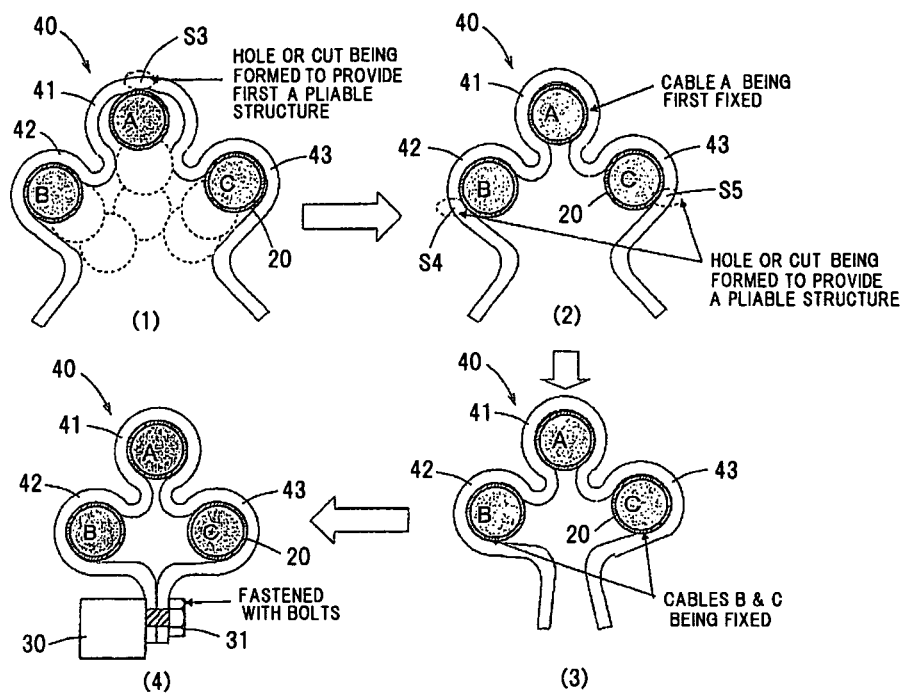
FIGS. 5A and 5B are diagrams for explaining operation of the cable fixing member shown in FIGS. 4A and 4B.

Referring to FIGS. 4A and 4B, a cable fixing member 40 in another embodiment according to the invention includes two clamped flanges 3 formed at both ends of a metal plate 2, and three C-shaped holding portions 41 to 43, one formed to be bent into a C-shape in cross section at a longitudinal middle portion (reference portion, i.e., a portion in the proximity of a part shown by symbol S3 in FIG. 5A(1)) of the metal plate 2, and two formed to be bent into C-shapes in cross section on both sides respectively of the longitudinal middle portion, to hold cables A, B, and C in the three C-shaped holding portions respectively, The three cables A, B, and C are held in an inverted triangular shape in transverse cross sectional view.

That is, the cable fixing member 40 differs from the above cable fixing member 1 in that the three cables A, B, and C are held in an inverted triangular shape.

C-Shaped Holding Portions 41 to 43

As with the C-shaped holding portions 4 of the cable fixing member 1, a bottom of the C-shaped holding portion 41 formed at the longitudinal middle portion of the metal plate 2 is formed with bend holes 7. Also, side surfaces adjacent to the clamped flanges 3 of the C-shaped holding portions 42 and 43 respectively are formed with bend holes 7. The sizes of the bend holes 7 are adjusted so that the bottom of the C-shaped holding portion 41 is first bent. By thus forming the bend holes 7, the fixing of each cable A, B, and C can be phased.

The C-shaped holding portion 41 and the C-shaped holding portions 42 and 43 are smoothly joined by joining portions 44 respectively having a circular arc cross section, while the clamped flanges 3 and the C-shaped holding portions 42 and 43 are smoothly joined by joining portions 45 respectively having a circular arc cross section.

Operation of the Cable Fixing Member 40

Referring to FIG. 5A, to fix the cables A, B, and C to the cable fixing member 40, (1) after the cables A, B, and C are disposed in the C-shaped holding portions 41 to 43 respectively of the cable fixing member 40, the metal plate 2 is bent at the bottom of the C-shaped holding portion 41 serving as a fulcrum S3 to cause the clamped flanges 3 to face and contact each other.

This first causes the C-shaped holding portion 41 to be bent to fold to the inner surface side thereof, and thereby hold the cable A therein. (2) Subsequently, the side surfaces of the C-shaped holding portions 42 and 43 serve as fulcrums S4 and S5 to fold to the inner surface sides respectively thereof. (3) Consequently, the cables B and C are held in the C-shaped holding portions 42 and 43 respectively.

Figure 5B:
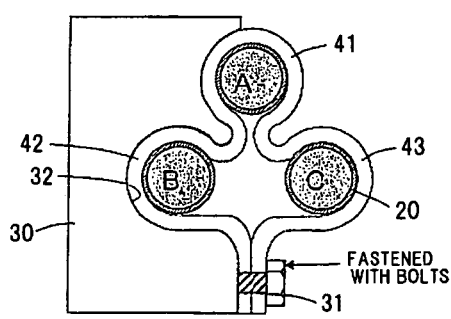
Figure 6A:
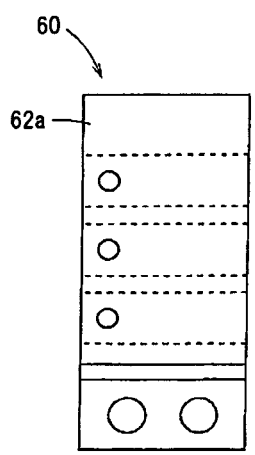
FIGS. 6A and 6B are a side view and a top view, respectively, showing a conventional cable fixing member.
Figure 6B:
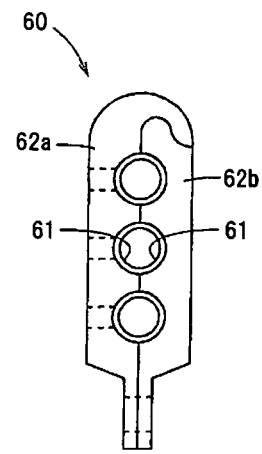

(4) Thereafter, the clamped flanges 3 are fixed to a structure 30 with bolts 31 or the like, whereby the cables A, B, and C are fixed in an inverted triangular shape in transverse cross sectional view, and the routing thereof is completed. At this point, as described above, a surface of the structure 30 may be formed with a receiving groove 32 matched to a surface shape of the cable fixing member 40 (see FIG. 5B).

Advantages of the Second Embodiment

This cable fixing member 40 has the same advantageous effects as the previously described cable fixing member 1. That is, the cable fixing member 40 allows compactness of the routing space for the cables A, B, and C, ensuring of low cost of the cable fixing member 40, and further enhancement of the routing of each cable A, B, and C.

Modifications to the Embodiments

Although the invention has been described with respect to the above embodiments, the invention is not limited thereto, but various alterations may be made without departing from the spirit and scope of the invention.

For example, an inner surface of the C-shaped holding portions 4 or the semicircular arc portions 5 may be shaped to have a groove for being engaged on to the calking portion 23 of the metallic cylinder 20 to more strongly regulate the longitudinal movement of the cables.

Also, although in the embodiments of the invention, the longitudinal middle portion of the belt-like metal plate 2 has been the reference portion so that the two C-shaped holding portions 4 are formed on both sides respectively of that reference portion, the longitudinal middle portion of the belt-like metal plate 2 may be not precisely the reference portion, without departing from the spirit and scope of the invention.

What is claimed is:

1. A cable fixing member comprising one belt-like metal plate bent to fix three cables that are spaced from each other and arranged to form a triangular shape in a transversal cross section to a structure, the cable fixing member comprising:
   two flanges formed at both ends of the metal plate;
   two C-shaped holding portions formed into C-shapes in a cross section on both sides respectively of a reference portion of the metal plate to hold two of the three cables and to surround at least 180 degrees of portions of a perimeter of each of the two of the three cables in the C-shaped holding portions respectively; and
   two semicircular arc portions formed into semicircular arc shapes in a cross section between the C-shaped holding portions and the flanges on the both sides respectively of the reference portion of the metal plate so that the two semicircular arc portions face each other to hold one of the three cables therebetween,
   wherein the metal plate is bent to allow the flanges to face and contact each other, such that each of the two C-shaped holding portions first holds each of the two of the three cables, thereafter the two semicircular arc portions face each other to hold the one of the three cables therebetween, thereby holding the three cables.

2. The cable fixing member according to claim 1, wherein the metal plate is bent at the two C-shaped holding portions serving as fulcrums respectively in such a manner that the two flanges face and contact each other, and two of the three cables are held in the two C-shaped holding portions respectively.

3. The cable fixing member according to claim 1, wherein the C-shaped holding portions are each formed with a bend hole or a cut along a line along which the metal plate is deliberately bent, so that when the metal plate is bent to cause the two flanges to face and contact each other, the C-shaped holding portions are pliable.

4. The cable fixing member according to claim 3, further comprising metallic cylinders in which the three cables respectively are held, and which each include a protruding portion for being engaged into the bend hole to prevent rotation of the cables.

5. The cable fixing member according to claim 4, wherein both ends of the metallic cylinders are formed with a flanged portion for restricting a longitudinal movement of the cables.

6. The cable fixing member according to claim 1, wherein the three cables are entirely spaced from each other.

7. The cable fixing member according to claim 1, wherein the one belt-like metal plate continuously extends on outer peripheries of the three cables.

8. The cable fixing member according to claim 1, wherein, in a cross sectional view, the two C-shaped holding portions contact an outer surface, throughout said at least 180 degrees of the perimeter, of each of the two of the three cables in the C-shaped holding portions.

9. The cable fixing member according to claim 1, wherein, in a cross sectional view, the two C-shaped holding portions continuously contact an outer surface, throughout said at least 180 degrees of the perimeter, of each of the two of the three cables in the C-shaped holding portions.

10. The cable fixing member according to claim 1, further comprising:
    a joining portion, comprising a circular arc cross section extending in an outer periphery of the metal plate, for joining the C-shaped holding portions.

11. A cable fixing member comprising one belt-like metal plate bent to fix three cables that are spaced from each other and arranged to form a triangular shape in a transversal cross section to a structure, the cable fixing member comprising:
    two flanges formed at both ends of the metal plate; and
    three C-shaped holding portions, one formed into a C-shape in a cross section at a reference portion of the metal plate, and two formed into C-shapes in a cross section on both sides respectively of the reference portion, to hold the cables and to surround at least 180 degrees of portions of a perimeter of each of the three cables in the three C-shaped holding portions respectively,
    wherein the metal plate is bent to allow the flanges to face and contact each other, such that the C-shaped holding portion at the reference portion first holds one of the three cables, thereafter the two C-shaped holding portions on the both sides of the reference portion hold the two of the three cables respectively, thereby holding the three cables.

12. The cable fixing member according to claim 11, wherein the metal plate is bent at the reference portion thereof serving as a fulcrum in such a manner that the two flanges face and contact each other, and one of the three cables is held in the C-shaped holding portion at the reference portion, and two of the three cables are held in the C-shaped holding portions on the both sides respectively of the reference portion.

13. The cable fixing member according to claim 11, wherein the C-shaped holding portions are each formed with a bend hole or a cut along a line along which the metal plate is deliberately bent, so that when the metal plate is bent to cause the two flanges to face and contact each other, the C-shaped holding portions are pliable.

14. The cable fixing member according to claim 13, further comprising metallic cylinders in which the three cables respectively are held, and which each include a protruding portion for being engaged into the bend hole to prevent rotation of the cables.

15. The cable fixing member according to claim 14, wherein both ends of the metallic cylinders are formed with a flanged portion for restricting a longitudinal movement of the cables.

16. The cable fixing member according to claim 11, wherein the three cables are entirely spaced from each other.

17. The cable fixing member according to claim 11, wherein the one belt-like metal plate continuously extends on outer peripheries of the three cables.

18. The cable fixing member according to claim 11, wherein, in a cross sectional view, the two C-shaped holding portions contact an outer surface, throughout said at least 180 degrees of the perimeter, of each of the two of the three cables in the C-shaped holding portions.

19. The cable fixing member according to claim 11, wherein, in a cross sectional view, the two C-shaped holding portions continuously contact an outer surface, throughout said at least 180 degrees of the perimeter, of each of the two of the three cables in the C-shaped holding portions.

20. The cable fixing member according to claim 11, further comprising:
a joining portion, comprising a circular arc cross section extending in an outer periphery of the metal plate, for joining the C-shaped holding portions.

* * * * *